United States Patent

[11] 3,594,913

| [72] | Inventor | George Tooby |
|---|---|---|
| | | 1355 Circle Drive, San Marino, Calif. 91108 |
| [21] | Appl. No. | 764,989 |
| [22] | Filed | Oct. 4, 1968 |
| [45] | Patented | July 27, 1971 |

[54] METHOD FOR DEHYDRATING MATERIALS
5 Claims, No Drawings

[52] U.S. Cl. ............................................. 34/5, 99/199, 34/48, 34/92
[51] Int. Cl. .................................................. F26b 5/06
[50] Field of Search ............................................. 99/199; 34/48, 92, 5

[56] References Cited
UNITED STATES PATENTS

| 3,264,747 | 8/1966 | Fuentevilla | 34/5 |
|---|---|---|---|
| 2,765,236 | 10/1956 | Blaine | 34/5 |
| 2,994,132 | 8/1961 | Neumann | 34/5 |
| 3,077,036 | 2/1963 | Neumann | 34/5 |
| 3,145,562 | 8/1964 | Hamilton | 34/5 |
| 3,169,049 | 2/1965 | Rey | 34/5 |
| 3,178,829 | 4/1965 | Cox | 34/5 |
| 3,233,333 | 2/1966 | Oppenheimer | 34/5 |
| 3,259,991 | 7/1966 | Illich | 34/5 |
| 3,271,874 | 9/1966 | Oppenheimer | 34/5 |
| 3,270,433 | 9/1966 | Nerge | 34/5 |
| 3,299,525 | 1/1967 | Thuse | 34/5 |
| 3,438,792 | 4/1969 | Kruger | 34/5 |

*Primary Examiner*—William J. Wye
*Attorney*—Christie, Parker & Hale

ABSTRACT: A method of dehydrating a heat-sensitive product including the steps of controllably freezing the product to be dried and then dehydrating the frozen product by subjecting it to an inert, dry gas arranged to have a preselected temperature, velocity and subatmospheric pressure to sublime the frozen liquid. The internal temperature of the product is maintained between 14°—27°F. during the dehydration period. The vaporized fluids are carried away from the surface of the product during the dehydration period.

METHOD FOR DEHYDRATING MATERIALS

This invention relates to a method for dehydrating materials and in particular to an improved method for freeze-drying materials.

This invention is an improvement over the method disclosed in copending application bearing Ser. No. 489,515 entitled "Method and Apparatus for Dehydrating Materials" now U.S. Pat. No. 3,487,554.

All present known methods of freeze-drying materials require that the internal temperature of the frozen product during the dehydration procedure be maintained at a temperature below +14° F. One such reference in the literature indicating the preferable freeze-drying temperature range is +14° F. to −40° F. is found in the fourth edition of Perry's Chemical Engineers Handbook, stating that the most freeze-drying is performed at such temperatures. All of the governmental and military specifications for freeze-dried products require that at no time should the internal temperature of the frozen product being dehydrated be allowed to reach a temperature above 8.6° F. The present state of the freeze-drying art, then, is that the preferred maximum internal temperature for products during the first and major part of the drying cycle must usually be below 8.6° F. for good quality products and never above 14° F.

It is also known, as exemplified by the publication "Advances in Food Research," Academic Press, New York, 1964, wherein there is disclosed freeze-drying curves showing the mean center temperature of various products sustained below −10° C. (+14° F.) until the critical point in drying is reached where the falling drying rate portion of the drying process begins and the product is dry enough so it cannot be damaged by melting.

The present invention provides an improved freeze-drying method wherein the frozen product during the dehydration procedure is maintained at a relatively high temperature, namely, above +14° F. and below +27° F. For most products the preferred internal temperature is approximately +20° F.

The method of the present invention has been employed to dehydrate frozen products at the aforementioned relatively high temperature unexpectedly resulting in freeze-dried food products with substantially better color, texture, flavor, and rehydration properties after storage than the prior art methods. Products that have been freeze-dried at the increased internal temperatures as disclosed by the present invention have been packaged in tin cans in which the air has been replaced with nitrogen gas along with products that have been freeze-dried with conventional methods or prior art techniques and after storage at 70—80° F. for periods of from 6 weeks to 1½ years remarkable differences in characteristics between these products were noted. The products that have been freeze-dried at the higher internal temperatures in accordance with the present invention after rehydration were brighter in color, had stronger and more pleasing flavor, were juicier, had better texture and had a more characteristic and pleasant odor, and still retained the original properties of rapid and complete rehydration. After the same storage periods the product dried at the lower temperatures or the prior art methods could only be rehydrated with difficulty and in comparison with the product produced by the present invention showed a marked decrease in color, flavor, texture and odor.

Broadly, the method of the present invention comprises the steps of dehydrating a heat-sensitive product including the steps of freezing a product to be dried and dehydrating the product and during the dehydration period maintaining the internal temperature of the product above 14° F.

Specifically, the method of freeze-drying of the present invention includes the maintaining of the amount of unfrozen moisture in the frozen product in the range of 3—25 percent of the total original weight of the frozen product. During the dehydration of the frozen product the internal temperature is continually sensed to maintain the internal temperature in the range of +14° F. to +27° F. until a relatively sudden and rapid increase in internal temperature is sensed. This sudden and rapid increase in internal temperature is indicative that the total moisture content of the frozen product has been reduced to approximately 25 percent. At this time the internal temperature can be rapidly increased to a preselected dehydration temperature to provide the desired amount of final moisture.

These and other features of the present invention may be more fully appreciated when considered in light of the following specification.

The method of high-temperature freeze-drying in accordance with the present invention can be practiced by the prior art techniques but preferably is practiced by means of the method and apparatus of the aforementioned copending application Ser. No. 489,515 now U.S. Pat. No. 3,487,554. Accordingly, for the purpose of the present disclosure, the disclosure of the aforementioned copending patent application is incorporated herein by reference. In the aforementioned copending application the method of dehydrating the frozen food products is accomplished at subatmospheric pressures. The present invention however, may be practiced by subliming the moisture at atmospheric pressures with a gas such as nitrogen. In addition high-vacuum chambers may be employed or microwave heating means used for effecting a desired dehydration at the desired relatively high temperatures. These and other prior art techniques, however, are difficult to adapt because of the difficulty of maintaining uniform temperature conditions throughout a batch of product.

As mentioned hereinabove the method of the present invention comprehends maintaining the frozen product at dehydration temperatures in the range of +14° F. to +27° F. and to maintain such internal temperatures, it is necessary to be able to sense the internal temperatures. A rapid method for determining the optimum temperature is to make a determination of the amount of free moisture at various temperatures for the particular product. This may be accomplished by using the apparatus described in copending patent application bearing Ser. No. 573,053 now U.S. Pat. No. 3,501,629 and entitled APPARATUS FOR DETERMINING THE MOISTURE CONTENT OF SOLIDS AND LIQUIDS. When the amount of unfrozen moisture in the frozen product is maintained in the range of 3 percent to 25 percent of the total original weight of the frozen product then the temperature of the frozen product will be maintained in the range of +14° F. to +27° F. It has been found that optimum product quality after storage can be correlated with specific internal temperatures and specific amounts of unfrozen moisture. For each particular product the best drying temperature and the best place to maintain the amount of unfrozen moisture is specific but within the limits given herein.

The temperature at which about 20 percent of the original moisture is free, that is liquid not ice crystals, gives optimum product quality for ground beef patties when the drying process is controlled to maintain this temperature as long as possible. It is not necessary to maintain the preferred temperature until drying is completed. As soon as the critical total moisture content is reached, usually about 25 percent, the internal temperature may be permitted to rise above the freezing point without damage to the product.

For each particular product the use of the apparatus described in copending patent application bearing Ser. No. 573,053 now U.S. Pat. No. 3,501,629 and entitled APPARATUS FOR DETERMINING THE MOISTURE CONTENT OF SOLIDS AND LIQUIDS; for continuously monitoring the amount of free moisture in the frozen product being dried and the correlation of the amount of free moisture present during drying with the quality of the product after storage permits the manufacture in subsequent runs of superior product by this method of high-temperature freeze-drying. The optimum free moisture level for optimum product quality determined for one product serves as a good guide to the optimum free moisture content in other products.

As an example of the method of the present invention, ground beef patties were frozen in 18 minutes using a stream of nitrogen at 20° F. employing the method and apparatus of said copending application, Ser. No. 489,515, now Pat. No. 3,487,554. When the drying was started, the internal temperature of the product was 10° F. The freezing temperature of this product had been observed to be 27.5° F. After drying for 20 minutes, the internal temperature of the product had increased to about 20° F., there being some variation between different patties. The internal temperature was controlled by controlling the temperature of the drying fluid or gas and by controlling the chamber pressure, to maintain 20° F. until there was a sudden increase in the internal temperature indicating that the critical moisture content has been reached and the product had entered the falling rate portion of the drying cycle. As soon as the product had reached this moisture content, of about 25 percent, as shown by the temperature change, the temperature of the drying gas was increased to 107° F. and the product dried until the internal temperature was 104° F. This final internal temperature has been found to correspond to a final moisture content of about 1.8 percent.

In this example the freezing time was 18 minutes; the internal temperature at the start of drying was +10° F.; 20 minutes was required to increase the internal temperature to the preferred +20° F. where it was maintained for 2 hours. One hour and 10 minutes was required to increase the internal temperature to 104° F.

The unexpected discovery of the benefits of this method of high-temperature freeze-drying was made imperically by comparing products, after storage for many months, dried at both low (prior art methods) and high temperatures in accordance with the present invention. Inasmuch as the composition of food products is complex and the reactions on storage resulting in product deterioration are also complex the reasons for the surprising benefits of high-temperature freeze-drying are not fully understood. The following theory, however, may account in part for the observed results.

Consider two ground beef patties, one at +10° F. and one at +20° F. In the first case the amount of free moisture is about 2.5 percent of the product weight and in the second case the amount of free moisture is about 8 percent of the product weight. As these products are dried, and their respective internal temperatures are maintained, the amount of free moisture will remain constant. The water evaporated will be replaced by ice thawing so that during the major part of the drying cycle the amount of liquid water present in the product is constant. In both cases, the amount of dissolved salts is constant. Assume, for example, that the unfrozen product contained 1 percent of various soluble salts. The ice produced by these freezing methods is substantially pure water. Thus in the first case the salt in the free water will have a concentration of 28 percent by weight while in the second case it will be about 11 percent by weigh of the total solution.

TABLE ILLUSTRATING DECREASING SALT CONCENTRATION WITH INCREASING TEMPERATURE OF FROZEN PRODUCTS

| Temp., °F.: | Percent total water frozen | Percent water in product | Percent unfrozen water in product | Percent salt in unfrozen water |
|---|---|---|---|---|
| −5 | 1.8 | 63.0 | 1.1 | 47.6 |
| +10 | 4.0 | 63.0 | 2.5 | 28.6 |
| +20 | 13.0 | 63.0 | 8.2 | 10.9 |
| +27 | 27.0 | 63.0 | 17.0 | 5.6 |

This table gives the relationship of internal temperature to percent unfrozen water in beef together with a hypothetical determination of the percent of salt in the unfrozen water based on an assumed 1 percent soluble salts in the product. It is presented for the purpose of illustrating the principal involved. In as much as all freeze-drying, prior to this invention, has been conducted at temperatures usually of −5° F. whereas we prefer to conduct our freeze-drying at temperatures of +20° F., it will be seen, by means of this table, that the concentration of soluble salts present in the unfrozen water during our process is approximately one-fourth the concentration of salts present in the prior art process.

Raising the internal temperature of the product during drying decreases the drying time. Depending on the equipment, and the variables, the drying time required with an internal temperature of +10° F. may be 50 percent more than that required at an internal temperature of +20° F. Thus it will be seen that in the first case the product has been exposed to a solution with a 28 percent salt concentration, for example for 12 hours, while in the second case the exposure is to a solution of only 11 percent concentration for 8 hours. The effect of the slightly higher temperature appears negligible when compared with the effect of higher concentration and longer time.

In attempting to explain the surprising difference in products freeze-dried at high and low temperature, one aspect of which is the relative maintenance of high rate and degree of rehydration in the first case, it has been concluded that the brine denaturation of protein plays a major role. The exposure of the food to a more concentrated solution of the natural salts for a longer time partially denatures the protein and starts other undesirable reactions which continue during storage. The result is that after storage products dried at low temperatures could only be partially rehydrated with difficulty, while those dried at high temperatures could be rehydrated easily and substantially completely and were of excellent quality.

What I claim is:

1. A method of dehydrating a heat-sensitive product including the steps of freezing a product to be dried,
    dehydrating the product by subliming the frozen liquid in the frozen product, and 14°—
    maintaining the internal temperature of the product during the dehydration period between 14—27° F.

2. A method of dehydrating as defined in claim 1 including the step of maintaining the amount of unfrozen moisture in the frozen product during dehydration in the range of 3—25 percent of the total original weight of the frozen product until the total moisture has been reduced to less than 35 percent of the product.

3. A method of dehydration as defined in claim 2 including increasing the internal temperature of the product to a preselected temperature after the total moisture is approximately 35 percent of the product.

4. A method of dehydrating a heat-sensitive product including the steps of controllably freezing a product to be dried,
    dehydrating the product by subjecting the thus frozen product to an inert, dry gas of a preselected temperature and velocity and maintained at a preselected atmospheric pressure to produce a balance between the heat transfer rate and the diffusion rate whereby the frozen liquid is sublimed, and
    maintaining the internal temperature of the product during the dehydration period between 14°—27° F., and
    carrying away the vaporized fluids from the surface of the product.

5. A method of dehydrating a heat-sensitive product as defined in claim 4 including the step of maintaining the amount of unfrozen liquid above 3 percent of the original weight of the product until the frozen liquid has been sublimed.